(12) United States Patent
Lee et al.

(10) Patent No.: US 11,370,212 B2
(45) Date of Patent: Jun. 28, 2022

(54) SYSTEM AND APPARATUS FOR LAMINATING OPTICAL FILM

(71) Applicant: LG CHEM, LTD., Seoul (KR)

(72) Inventors: Beom Seok Lee, Daejeon (KR); Yu Jin Lim, Daejeon (KR); Chan Soo Kim, Daejeon (KR); Eung Jin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/967,573

(22) PCT Filed: Feb. 13, 2019

(86) PCT No.: PCT/KR2019/001764
§ 371 (c)(1),
(2) Date: Aug. 5, 2020

(87) PCT Pub. No.: WO2019/160328
PCT Pub. Date: Aug. 22, 2019

(65) Prior Publication Data
US 2021/0268788 A1  Sep. 2, 2021

(30) Foreign Application Priority Data
Feb. 13, 2018 (KR) .......................... 10-2018-0017588

(51) Int. Cl.
*B32B 41/00* (2006.01)
*B32B 38/18* (2006.01)
(Continued)

(52) U.S. Cl.
CPC ...... *B32B 38/1841* (2013.01); *B32B 37/0053* (2013.01); *B32B 38/0004* (2013.01);
(Continued)

(58) Field of Classification Search
CPC ............ B32B 38/1841; B32B 37/0053; B32B 38/1858; B32B 38/0004; B32B 41/00;
(Continued)

(56) References Cited

U.S. PATENT DOCUMENTS 7,922,843 B2    4/2011  Kitada et al.
2009/0199950 A1* 8/2009  Kitada .................... B32B 41/00
                                                      156/64

(Continued)

FOREIGN PATENT DOCUMENTS

CN    105044802 A    11/2015
CN    209400723 U    9/2019
(Continued)

OTHER PUBLICATIONS

International Search Report from PCT/KR2019/001764, dated May 22, 2019.
(Continued)

*Primary Examiner* — Michael N Orlando
*Assistant Examiner* — Joshel Rivera
(74) *Attorney, Agent, or Firm* — Dentons US LLP

(57) ABSTRACT

The present invention relates to an optical film laminating system for laminating an optical film on a panel in order to manufacture a display unit wherein a control unit which sets, in accordance with attachment conditions, an optical film laminating mode in respect to the panel to at least one of a first mode in which the panel and the optical film are inputted together between a first roller unit and a second roller unit so that the optical film is laminated on the panel, and a second mode in which the second panel conveying unit holds the panel by suction and conveys the panel and the optical film is inputted between the panel and an attachment
(Continued)

roller unit, which is any one of the first roller unit and the second roller unit, so that the optical film is laminated on the panel.

9 Claims, 6 Drawing Sheets

(51) Int. Cl.
*B32B 37/00* (2006.01)
*B32B 38/00* (2006.01)
*B32B 38/10* (2006.01)

(52) U.S. Cl.
CPC .......... *B32B 38/10* (2013.01); *B32B 38/1858* (2013.01); *B32B 41/00* (2013.01); *B32B 2307/42* (2013.01); *B32B 2457/20* (2013.01); *B32B 2551/00* (2013.01)

(58) Field of Classification Search
CPC . B32B 38/10; B32B 2307/42; B32B 2457/20; B32B 2551/00
USPC .................... 156/60, 64, 350, 351, 378, 379
See application file for complete search history.

(56) References Cited

U.S. PATENT DOCUMENTS

| 2010/0283943 | A1* | 11/2010 | Kimura | ................ | G02F 1/1303 |
| | | | | | 349/96 |
| 2015/0234096 | A1 | 8/2015 | Yura et al. | | |
| 2015/0328870 | A1 | 11/2015 | Yura et al. | | |
| 2017/0348957 | A1 | 12/2017 | Park et al. | | |

FOREIGN PATENT DOCUMENTS

| JP | 2005321582 A | 11/2005 |
| JP | 2008-155465 A | 7/2008 |
| JP | 2016109748 A | 6/2016 |
| JP | 2017-30342 A | 2/2017 |
| KR | 10-20090060347 A | 6/2009 |
| KR | 10-1010990 B1 | 1/2011 |
| KR | 10-20140104113 A | 8/2014 |
| KR | 10-20150020234 A | 2/2015 |
| KR | 10-20150082994 A | 7/2015 |
| KR | 10-1544542 B1 | 8/2015 |
| KR | 10-20150121463 A | 10/2015 |
| KR | 10-20150133020 A | 11/2015 |
| KR | 10-1678803 B1 | 11/2016 |
| KR | 10-1704973 B1 | 2/2017 |
| KR | 10-20170021622 A | 2/2017 |
| KR | 10-2018-0024346 A | 3/2018 |
| TW | 201427828 A | 7/2014 |
| WO | 2015167276 A1 | 5/2015 |
| WO | 2016088499 A1 | 9/2016 |

OTHER PUBLICATIONS

Written Opinion of the ISA from PCT/KR2019/001764, dated May 22, 2019.
Office Action of Taiwanese Patent Office in Appl'n No. 108104799, dated Jan. 7, 2019.
Office Action of Korean Patent Office in Appl'n No. 10-20190016747, dated Jul. 23, 2020.
Office Action of Chinese Patent Office in Appl'n No. 201910113074.9, dated Jun. 5, 2020.
Extended Search Report of European Patent Office in Appl'n No. 19753626.1, dated Dec. 21, 2020.
Notice of Allowance of Korean Patent Office in Appl'n No. 10-2019-0016747, dated Oct. 7, 2020.

\* cited by examiner

[Figure 1]
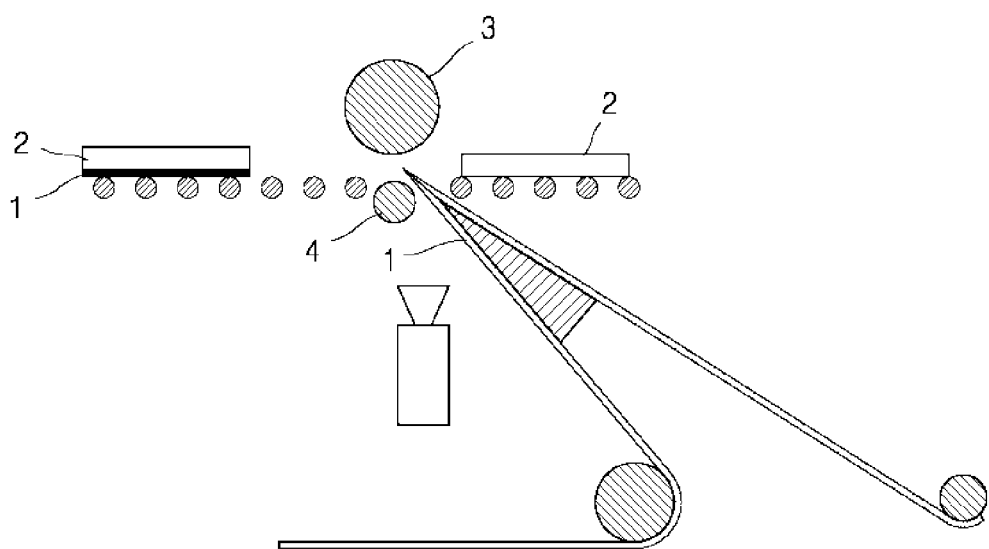

[Figure 2]
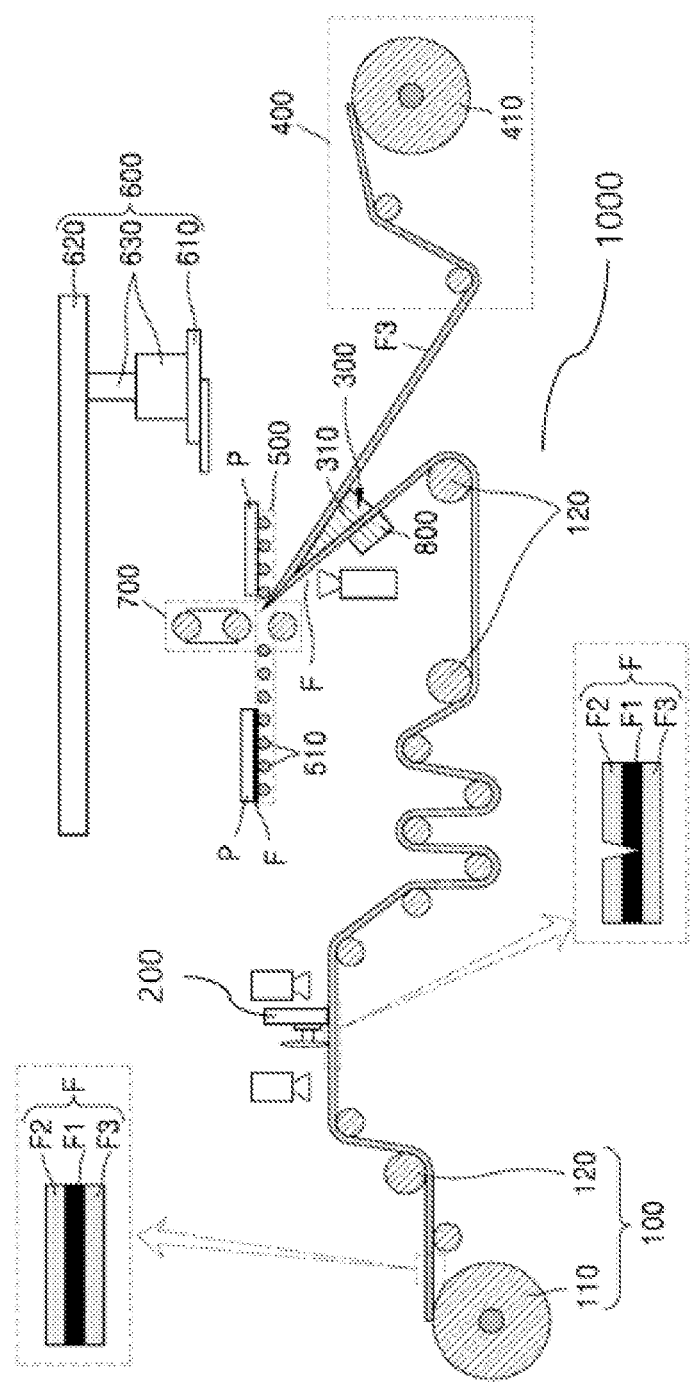

[Figure 3]
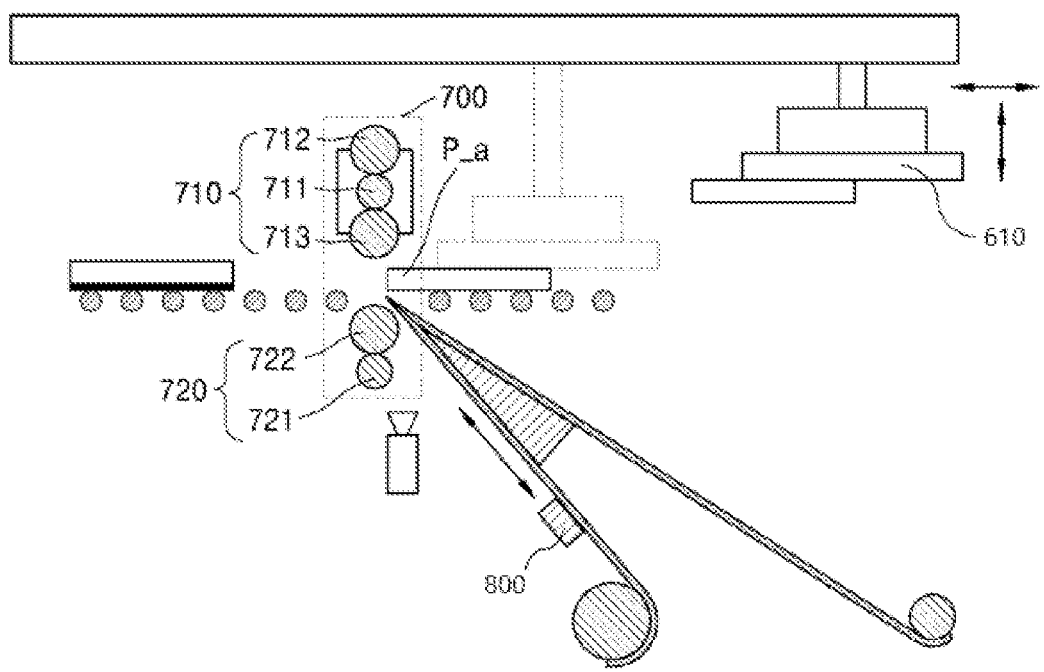

[Figure 4]
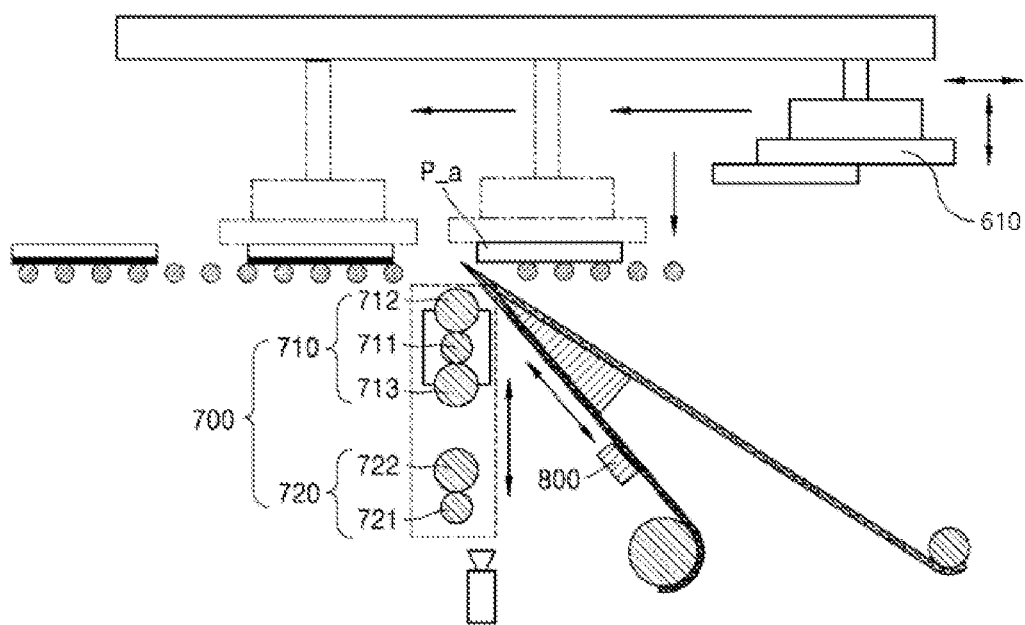

[Figure 5]
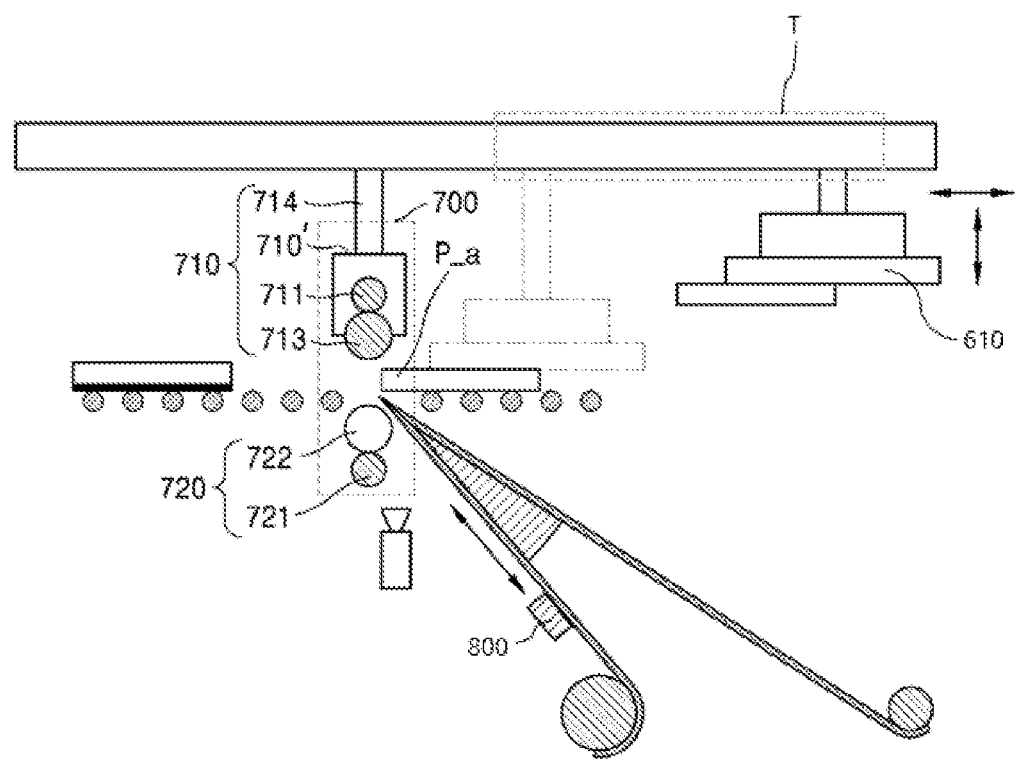

[Figure 6]
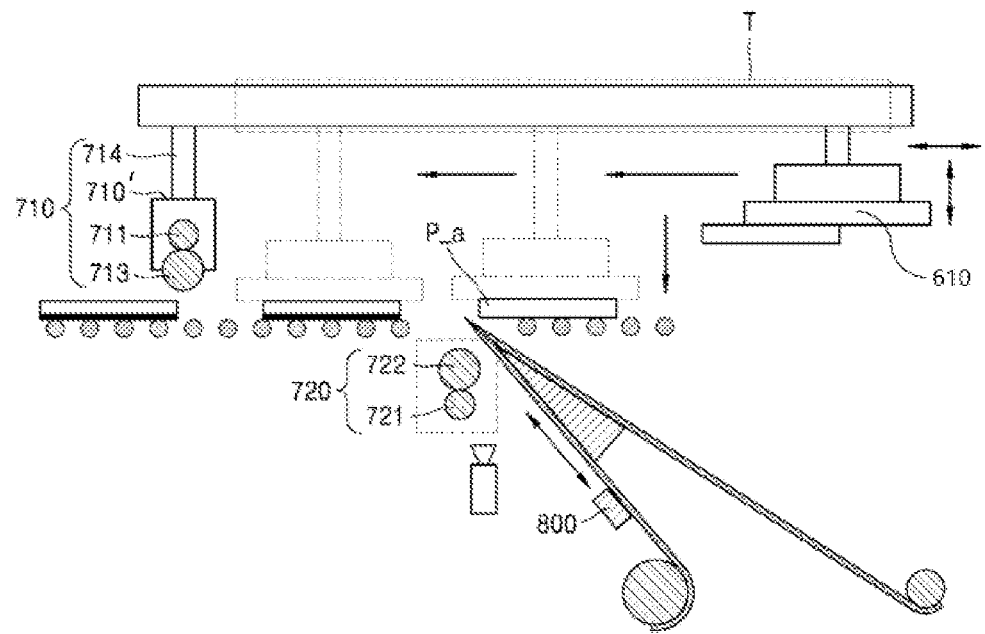

SYSTEM AND APPARATUS FOR LAMINATING OPTICAL FILM

The present application is a National Phase entry pursuant to 35 U.S.C. § 371 of International Application No. PCT/KR2019/001764 filed on Feb. 13, 2019, and claims priority to and the benefit of Korean Patent Application No. 10-2018-0017588 filed on Feb. 13, 2018, the entire contents of which are incorporated herein by reference.

FIELD

The present invention relates to a system and an apparatus for laminating an optical film on a panel to manufacture a display unit.

BACKGROUND

A display unit may be manufactured by attaching a functional optical film such as a polarizing film, a phase difference film, a brightness improving film, and/or a diffusion film onto a surface of a panel.

FIG. 1 is a side view schematically illustrating an optical film laminating system according to an example in the related art.

In general, an optical film 1 and a panel 2 are inputted between a pair of rollers 3 and 4 and the optical film 1 is laminated on the panel 2 as the pair of rollers 3 and 4 rotate, in order to continuously laminate the optical film.

Meanwhile, there is a great likelihood in this way that the panel 2 and the optical film 1 may meander while being conveyed by the pair of rollers 3 and 4, and the meandering of the panel 2 and the optical film 1 may cause a problem of deterioration in attachment precision.

Meanwhile, a required attachment condition may sometimes vary depending on specifications of the display unit. Specifically, required attachment precision may vary depending on the specifications of the display unit.

The optical film laminating system illustrated in FIG. 1 may be used for a display unit that requires relatively low attachment precision. However, the optical film laminating system illustrated in FIG. 1 may be not suitable for a display unit that requires relatively high attachment precision.

Of course, there may be an optical film laminating system for manufacturing the display unit that requires relatively high attachment precision.

However, demands for multiple types of display units may vary depending on the number of required display units and on the timing when the display units are required. As a result, the retention and arrangement of all multiple optical film laminating systems, which are suitable for multiple display units, respectively, in a factory may cause excessive use of space and facilities.

The above-mentioned background art is technical information that the inventors have retained to derive exemplary embodiments of the present invention or have obtained in the course of deriving the exemplary embodiments of the present invention, and cannot be thus said to be technical information known to the public before filing the invention.

SUMMARY

Exemplary embodiments of the present invention have been made in an effort to provide a single optical film laminating system and a single optical film laminating apparatus which are capable of manufacturing all multiple types of display units which are classified by attachment conditions.

An optical film laminating system according to an exemplary embodiment of the present invention may include: a first panel conveying unit which includes multiple conveying rollers that support a lower portion of the panel and convey the panel; a second panel conveying unit which holds any one of an upper portion and a lower portion of the panel by suction and conveys the panel; a laminating unit which is a means for laminating an optical film on the panel and includes a first roller unit and a second roller unit disposed to be vertically spaced apart from each other; and a control unit which sets, in accordance with attachment conditions, an optical film laminating mode in respect to the panel to at least one of a first mode in which the panel and the optical film are inputted together between the first roller unit and the second roller unit so that the optical film is laminated on the panel, and a second mode in which the second panel conveying unit holds the panel by suction and conveys the panel and the optical film is inputted between the panel and an attachment roller unit, which is any one of the first roller unit and the second roller unit, so that the optical film is laminated on the panel.

In the present exemplary embodiment, when the optical film laminating mode in respect to the panel is set to the second mode by the control unit, the first roller unit and the second roller unit may be disposed with the panel interposed therebetween at a side opposite to the second panel conveying unit.

In the present exemplary embodiment, when the optical film laminating mode in respect to the panel is set to the second mode by the control unit, a non-attachment roller unit, which is one of the first roller unit and the second roller unit, and is not the attachment roller unit, may be disposed so as not to overlap a conveying trajectory of the second panel conveying unit.

In the present exemplary embodiment, a roller unit, which is one of the first roller unit and the second roller unit and is positioned to be closer to the second panel conveying unit than is the other of the first roller unit and the second roller unit, may include a support roller, and an upper roller and a lower roller which are vertically disposed with the support roller interposed therebetween.

In the present exemplary embodiment, when the optical film laminating mode in respect to the panel is set to the first mode by the control unit, the second panel conveying unit may fix and hold a part of the panel by suction for a predetermined period of time before the first roller unit and the second roller unit rotate.

In the present exemplary embodiment, when the optical film laminating mode in respect to the panel is set to the second mode by the control unit, the attachment roller unit may laminate the optical film on the panel by pressing the optical film against the panel which is being held by suction and conveyed by the second panel conveying unit.

In the present exemplary embodiment, the optical film laminating system may further include an optical film support unit which supports and holds, by suction, an upstream portion of the optical film which is positioned upstream from a tip portion of the optical film laminated on the panel in a conveyance direction of the optical film, in which the optical film support unit moves in the conveyance direction of the optical film while holding the upstream portion of the optical film by suction when the optical film is being laminated on the panel.

In the present exemplary embodiment, after the optical film is completely laminated on the panel, the optical film support unit may release the optical film, move in a direction opposite to the conveyance direction of the optical film, and then support and hold, by suction, an upstream portion of an optical film subsequent to the optical film being completely laminated.

In the present exemplary embodiment, the attachment condition may be attachment position precision of the optical film in respect to the panel, and the attachment position precision required in the second mode may be higher than the attachment position precision required in the first mode.

An optical film laminating apparatus according to an exemplary embodiment of the present invention may include: a first panel conveying unit which includes multiple conveying rollers that support a lower portion of the panel and convey the panel; a second panel conveying unit which holds any one of an upper portion and the lower portion of the panel by suction and conveys the panel; a laminating unit for laminating an optical film on the panel and includes a first roller unit and a second roller unit disposed to be vertically spaced apart from each other; a control unit which sets, in accordance with attachment conditions, an optical film laminating mode in respect to the panel to at least one of a first mode in which the panel and the optical film are inputted together between the first roller unit and the second roller unit so that the optical film is laminated on the panel, and a second mode in which the second panel conveying unit holds the panel by suction and conveys the panel and the optical film is inputted between the panel and an attachment roller unit, which is any one of the first roller unit and the second roller unit, so that the optical film is laminated on the panel; and a drive unit which shifts a position of at least one of the first roller unit and the second roller unit when the control unit switches the optical film laminating mode in respect to the panel from one of the first mode and the second mode to the other of the first mode and the second mode.

According to the optical film laminating system according to the exemplary embodiment of the present invention, the single optical film laminating system may manufacture all multiple types of display units which are classified by attachment conditions.

In particular, optical film laminating apparatus or mechanism, which are optimized in accordance with required attachment conditions, may be different from each other. However, the optical film laminating system according to the exemplary embodiment of the present invention may simply switch the optical film laminating apparatus or mechanism optimized in accordance with the attachment conditions.

Specifically, in terms of process efficiency in minimizing a process time, a first method, which inputs a panel and an optical film between a pair of rollers, is suitable to laminate the optical film to manufacture a display unit that requires relatively low attachment precision, and a second method, which increases the amount of time taken to fix a panel in order to minimize meandering of the panel, is suitable to laminate an optical film to manufacture a display unit that requires relatively high attachment precision. The optical film laminating system according to the exemplary embodiment of the present invention may implement both of the first method and the second method.

BRIEF DESCRIPTION OF THE DRAWINGS

FIG. 1 is a side view schematically illustrating an optical film laminating system according to an example in the related art.

FIG. 2 is a side view schematically illustrating an optical film laminating system according to a first exemplary embodiment of the present invention.

FIG. 3 is a schematic view schematically illustrating an operating process of a main part of the optical film laminating system according to the first exemplary embodiment of the present invention in a case in which an optical film laminating mode is set to a first mode.

FIG. 4 is a schematic view schematically illustrating an operating process of the main part of the optical film laminating system according to the first exemplary embodiment of the present invention in a case in which the optical film laminating mode is set to a second mode.

FIG. 5 is a schematic view schematically illustrating an operating process of a main part of an optical film laminating system according to a second exemplary embodiment of the present invention in the case in which the optical film laminating mode is set to the first mode.

FIG. 6 is a schematic view schematically illustrating an operating process of the main part of the optical film laminating system according to the second exemplary embodiment of the present invention in the case in which the optical film laminating mode is set to the second mode.

DETAILED DESCRIPTION

The present invention will be apparent with reference to exemplary embodiments to be described below in detail together with the accompanying drawings. However, the present invention is not limited to the exemplary embodiments disclosed herein but will be implemented in various forms. The exemplary embodiments are provided so that the present invention is completely disclosed, and a person with ordinary skill in the art can fully understand the scope of the present invention. Therefore, the present invention will be defined only by the scope of the appended claims. Meanwhile, the terms used in the present specification are for explaining the exemplary embodiments, not for limiting the present invention. Unless particularly stated otherwise in the present specification, a singular form also includes a plural form. In addition, the terms such as "comprises (includes)" and/or "comprising (including)" used in the specification do not exclude presence or addition of one or more other constituent elements, steps, operations, and/or elements, in addition to the mentioned constituent elements, steps, operations, and/or elements. The terms such as "first" and "second" may be used to describe various constituent elements, but the constituent elements should not be limited by the terms. These terms are used only to distinguish one constituent element from another constituent element.

First, an optical film laminating apparatus, which is used for a below-mentioned optical film laminating system according to an exemplary embodiment of the present invention, may include: a first panel conveying unit which includes multiple conveying rollers that may support a lower portion of a panel and convey the panel; a second panel conveying unit which may hold any one of an upper portion and a lower portion of the panel by suction and convey the panel; a laminating unit for laminating an optical film on the panel and includes a first roller unit and a second roller unit disposed to be vertically spaced apart from each other; a control unit which sets, in accordance with attachment conditions, an optical film laminating mode in respect to the panel to at least one of a first mode in which the panel and the optical film are inputted together between the first roller unit and the second roller unit so that the optical film may be laminated on the panel, and a second mode in which the second panel conveying unit holds the panel by suction and conveys the panel and the optical film is inputted between the panel and an attachment roller unit, which is any one of the first roller unit and the second roller unit, so that the optical film may be laminated on the panel; and a drive unit which shifts a position of at least one of the first roller unit and the second roller unit when the control unit switches the optical film laminating mode in respect to the panel from one of the first mode and the second mode to the other of the first mode and the second mode.

Hereinafter, the present invention will be described in detail with reference to the accompanying drawings.

FIG. 2 is a side view schematically illustrating an optical film laminating system according to a first exemplary embodiment of the present invention, FIG. 3 is a schematic view schematically illustrating an operating process of a main part of the optical film laminating system according to the first exemplary embodiment of the present invention in a case in which an optical film laminating mode is set to a first mode, and FIG. 4 is a schematic view schematically illustrating an operating process of the main part of the optical film laminating system according to the first exemplary embodiment of the present invention in a case in which the optical film laminating mode is set to a second mode.

An optical film laminating system 1000 according to the first exemplary embodiment of the present invention is a system for laminating an optical film on a panel to manufacture a display unit capable of displaying images.

A liquid crystal panel having a liquid crystal layer and an OLED panel having an organic EL layer may be the panel applicable to the optical film laminating system 1000. Any panel may be applied as long as the panel is a panel on which an optical film having an optical function, such as a polarizing film, a diffusion film, a brightness improving film, and an anti-reflection film, needs to be laminated.

The optical film may have a laminated structure in which multiple films are laminated. The types of multiple films, which constitute the laminated structure of the optical film, and the number of laminated layers may vary. Hereinafter, for convenience of description, there will be described an example in which a structure of an optical film F is made by laminating a polarizing film F1, a protective film F2 which is configured to protect one surface of the polarizing film, and a release film F3 which is adhesively attached to the other surface of the polarizing film F1 in order to continuously supply the polarizing film. Further, in order to laminate the optical film F on a panel P, it is necessary to peel off the release film F3 to expose an adhesive layer on a surface of the optical film F from which the release film F3 is peeled off. Even though specific explanation will be omitted from the description of the present invention, it is assumed that during the process of laminating the optical film F on the panel P, the optical film F has a structure in which the release film F3 is peeled off.

The optical film laminating system 1000 may include an optical film supply unit 100, an optical film cutting unit 200, a peeling unit 300, a release film recovery unit 400, a first panel conveying unit 500, a second panel conveying unit 600, a laminating unit 700, an optical film support unit 800, and a control unit (not illustrated).

The optical film supply unit 100 may include a supply roll 110 which may unwind and supply the optical film F in a state in which the optical film F elongated in a longitudinal direction thereof is wound around the supply roll 110, and multiple support rolls 120 which support the optical film F being unwound longitudinally while imparting tension to the optical film F.

The optical film cutting unit 200 may have a cutting means capable of repeatedly cutting the optical film F which is continuously supplied, and the optical film F is cut in a width direction thereof at a predetermined interval in a longitudinal direction thereof in order to form multiple sheet pieces each corresponding to a size of the panel P. A circular blade, a laser device, or the like may be used as the cutting means. Meanwhile, it is possible to use a so-called 'half-cutting' method, as a method of cutting the optical film, which leaves the release film F3 uncut so that the optical film may be continuously conveyed until the optical film is laminated on the panel. Further, in a case in which a defect exists on the optical film, a so-called 'skip-cutting' method may also be used for a cutting process in order to remove a defective region including the defect. Meanwhile, an image capturing device (cam) may be used to determine a position on the optical film at which a defect is removed or the optical film is cut.

The peeling unit 300 may peel off the release film F3 on the optical film F in order to laminate the optical film F on the panel P. The peeling unit 300 includes an edge portion 310 that bends back the release film F3 so that a conveyance route of the release film F3 is changed, such that the peeling unit 300 may peel off the release film F3 from the optical film sheet piece formed by the half-cutting method.

The release film recovery unit 400 may include a recovery roll 410 that may wind and recover the release film F3 peeled off by the peeling unit 300.

The first panel conveying unit 500 is for conveying the panel P before the optical film F is laminated on the panel P and/or after the optical film F is laminated on the panel P. The first panel conveying unit 500 may include multiple conveying rollers 510 which are disposed to be spaced apart from one another in a conveyance direction of the panel P.

The second panel conveying unit 600 may be a means for conveying the panel P before the optical film F is laminated on the panel P and when the optical film F is being laminated on the panel P. The second panel conveying unit 600 may hold any one of upper and lower portions of the panel P by suction and convey the panel P. The second panel conveying unit 600 may include a suction plate 610 which supports any one of the upper and lower portions of the panel P by vacuum suction, a horizontal guide unit 620 which guides a horizontal movement of the suction plate 610, and a connecting unit 630 which connects the suction plate 610 and the horizontal guide unit 620. The connecting unit 630 may also serve to guide the suction plate 610 so that the suction plate 610 may reciprocally move vertically. Hereinafter, for convenience of description, the present invention will be described on the assumption that the second panel conveying unit 600 holds the upper portion of the panel P by suction and conveys the panel P.

The laminating unit 700 is a means for laminating the optical film F on the panel P. The laminating unit 700 may include a first roller unit 710 and a second roller unit 720 disposed to be vertically spaced apart from each other.

In the first exemplary embodiment, as illustrated for example in FIG. 3, the first roller unit 710, which is positioned to be closer to the second panel conveying unit 600 than is the second roller unit 720, may include a support roller 711, and an upper roller 712 and a lower roller 713 which are disposed vertically with the support roller 711 interposed therebetween. Here, the support roller 711 may support the upper roller 712 and the lower roller 713 to prevent bending deflection of the upper roller 712 and the lower roller 713.

The second roller unit 720, which is disposed to be farther from the second panel conveying unit 600 than is the first roller unit 710, may include a support roller 721 and an attachment roller 722 which is disposed above or below the support roller 721 and supported by the support roller 721. Here, the support roller 721 may support the attachment roller 722 to prevent bending deflection of the attachment roller 722. In the present exemplary embodiment, there is described the example in which the second panel conveying unit 600 is positioned above the panel P and the optical film is laminated on the lower surface of the panel P. Therefore, the attachment roller 722, which is configured to laminate the optical film F on the lower surface of the panel P while pressing the optical film F against the lower surface of the panel P, needs to be positioned above the support roller 721.

To prevent the optical film F from meandering when the optical film F is being laminated on the panel P, the optical film support unit 800 may support and hold, by suction, an upstream portion of the optical film F which is positioned upstream, in the conveyance direction of the optical film, from a tip portion of the optical film F being laminated on the panel P.

When the optical film F is being laminated on the panel P, the optical film support unit 800 may move in the conveyance direction of the optical film F while holding the upstream portion of the optical film F by suction (step (a)).

After the optical film F is completely laminated on the panel P (specifically, after the optical film sheet piece is completely laminated on the panel P), the optical film support unit 800 releases the optical film and then moves in a direction opposite to the conveyance direction of the optical film. Thereafter, the optical film support unit 800 may support and hold, by suction, an upstream portion of an optical film subsequent to the optical film which has been completely laminated (specifically, the optical film sheet piece which has been completely laminated) (step (b)).

The optical film support unit 800 operates while repeating step (a) and step (b).

In accordance with the attachment conditions, the control unit (not illustrated) may set the optical film laminating mode in respect to the panel to at least one of the first mode and the second mode which will be described below. The control unit may be implemented as various aspects such as a circuit board, an integrated circuit chip, a series of computer programs installed on hardware, firmware, and software in order to control the first roller unit 710, the second roller unit 720, and/or the second panel conveying unit 600 in accordance with the exemplary embodiments and the optical film laminating modes in respect to the panel.

The first mode of the optical film laminating modes in respect to the panel is a mode in which the panel and the optical film F are inputted together between the first roller unit 710 and the second roller unit 720 disposed to be vertically spaced apart from each other so that the optical film F may be laminated on the panel P.

The second mode of the optical film laminating modes in respect to the panel may be a mode in which the second panel conveying unit 600 holds the panel P by suction and conveys the panel P and the optical film F is inputted between the panel P and an attachment roller unit, which is any one of the first roller unit 710 and the second roller unit 720, so that the optical film F may be laminated on the panel P.

When the laminating mode is set to the first mode or the second mode by the control unit, the first roller unit 710 and/or the second roller unit 720 is moved by the predetermined drive unit to a position required by each of the modes.

The drive unit may include a moving unit which is connected to the first roller unit and/or the second roller unit, a guide unit which guides a movement direction of the moving unit, and a motor which provides power to move the moving unit when electric power is supplied to the motor. The form and structure of the drive unit may be variously modified as long as the drive unit may be configured to shift the position of the first roller unit and/or the second roller unit.

Here, the attachment condition may be attachment position precision of the optical film in respect to the panel. The attachment position precision required in the second mode may be higher than the attachment position precision required in the first mode. For example, the attachment position precision required in the first mode may be at a level where a permissible error limit is 300 µm, and the attachment position precision required in the second mode may be at a level where a permissible error limit is 200 µm.

As illustrated for example in FIG. 3, when the optical film laminating mode in respect to the panel is set to the first mode by the control unit, the panel P and the optical film F may be inputted together between the first roller unit 710 and the second roller unit 720 in order to laminate the optical film on the panel. Further, the lower roller 713 of the first roller unit 710 and the attachment roller 722 of the second roller unit 720 move adjacent to each other and rotate while pressing a part of the panel P and a part of the optical film F, such that the panel P and the optical film F are conveyed in one direction and the optical film F is laminated on the panel P.

When the optical film laminating mode in respect to the panel is set to the first mode, a region of the panel P, in which the optical film is to be laminated and which is positioned upstream or downstream from the laminating unit 700 in the conveyance direction of the panel P, may be supported by the first panel conveying unit.

Meanwhile, as further illustrated in FIG. 3, when the optical film laminating mode in respect to the panel is set to the first mode, a part of the panel P may be fixed by the second panel conveying unit 600 before the first roller unit 710 and the second roller unit 720 rotate. Specifically, the suction plate 610 may support and hold, by suction, a portion of the panel P except for a tip portion P_a, align the position of the panel P, and then input the tip portion P_a of the panel P between the first roller unit 710 and the second roller unit 720. Thereafter, the first roller unit 710 and the second roller unit 720 may move adjacent to each other to press the tip portion P_a of the panel P and the tip portion of the optical film F, thereby aligning the tip portion P_a of the panel P and the tip portion of the optical film F. That is, the position of the panel P and the position of the optical film F may be aligned immediately before the optical film F is laminated on the panel P, specifically, immediately before the first roller unit 710 and the second roller unit 720 rotate, and as a result, it is possible to improve the attachment precision of the optical film F.

As illustrated for example in FIG. 4, when the optical film laminating mode in respect to the panel is set to the second mode by the control unit, the panel P may be held by suction and conveyed by the second panel conveying unit 600 when the optical film F is being laminated on the panel P, and the optical film F may be inputted between the panel P and the attachment roller unit, which is any one of the first roller unit 710 and the second roller unit 720. Further, the attachment roller unit may laminate the optical film F on the panel P by pressing the optical film F against the panel P which is being held by suction and conveyed by the second panel conveying unit 600.

Specifically, in the first exemplary embodiment, when the optical film laminating mode in respect to the panel is set to the second mode by the control unit, both of the first roller unit 710 and the second roller unit 720, which are disposed to be vertically spaced apart from each other with the panel P interposed therebetween in the first mode, may be moved toward a lower side of the panel P in the second mode. Therefore, the first roller unit 710 and the second roller unit 720 may be disposed with the panel P interposed therebetween at a side (the lower side of the panel P in the exemplary embodiment illustrated in FIG. 4) opposite to the second panel conveying unit 600, such that the second panel conveying unit 600 may be in a state in which the second panel conveying unit 600 may convey the panel P in one direction (the left direction based on FIG. 4) without interference with the laminating unit 700. Further, the first roller unit 710, which is positioned to be closer to the second panel conveying unit than is the second roller unit 720, serves as the attachment roller unit in the second mode.

In this case, the tip portion P_a of the panel P and the tip portion of the optical film F may be aligned, and then the upper roller 712 of the first roller unit 710 may move adjacent to the lower surface of the panel P to press the tip portion of the optical film F against the lower surface of the panel P. Further, the suction plate 610 is conveyed in parallel with one direction of the horizontal guide unit 620 (the left direction based on FIG. 4), and the upper roller 712 of the first roller unit 710 rotates in synchronization with a conveying speed of the suction plate 610, such that the optical film F is laminated on the panel P. Meanwhile, the panel P is conveyed by the suction plate 610 that moves in one direction of the horizontal guide unit 620 when the optical film F is being laminated on the panel P, and as a result, the meandering of the panel P may be minimized and thus the attachment precision of the optical film may be improved in comparison with the first mode.

After the optical film is completely laminated on the panel P, the processes of allowing the second panel conveying unit to release the panel P, moving the second panel conveying unit again upstream from the laminating unit 700 in the conveyance direction of the panel P, and allowing the second panel conveying unit to support and hold the subsequent panel P by suction and to convey the panel P in the predetermined conveyance direction are performed and repeated.

FIG. 5 is a schematic view schematically illustrating an operating process of a main part of an optical film laminating system according to a second exemplary embodiment of the present invention in the case in which the optical film laminating mode is set to the first mode, and FIG. 6 is a schematic view schematically illustrating an operating process of the main part of the optical film laminating system according to the second exemplary embodiment of the present invention in the case in which the optical film laminating mode is set to the second mode.

Because the optical film laminating system according to the second exemplary embodiment is mostly identical, in terms of configurations and operations, to the optical film laminating system according to the first exemplary embodiment, a detailed description thereof will be omitted and only differences between the two optical film laminating systems will be described.

The first exemplary embodiment has described so that the first roller unit 710, which is positioned to be closer to the second panel conveying unit 600 than is the second roller unit 720, includes the support roller 711 and the upper roller 712 and the lower roller 713 disposed vertically with the support roller 711 interposed therebetween.

In contrast, in the second exemplary embodiment, the upper roller 712 may be omitted from the first roller unit 710 which is positioned to be closer to the second panel conveying unit 600 than is the second roller unit 720. Meanwhile, the first roller unit 710 may include a predetermined conveyance guide unit, a housing 710' which defines an external appearance of the first roller unit 710, and a connecting unit 714 which may be conveyed along the conveyance guide unit and is connected to the housing 710'. Here, the conveyance guide unit may be substituted with the horizontal guide unit 620 of the second panel conveying unit 600.

Meanwhile, the first exemplary embodiment has described that when the optical film laminating mode in respect to the panel is set to the second mode by the control unit, both of the first roller unit 710 and the second roller unit 720, which are disposed to be vertically spaced apart from each other with the panel P interposed therebetween in the first mode, are moved toward the lower side of the panel P in the second mode.

In contrast, in the second exemplary embodiment, when the optical film laminating mode in respect to the panel is set to the second mode by the control unit, a non-attachment roller unit, which is one of the first roller unit 710 and the second roller unit 720 and is not the attachment roller unit, may be disposed so as not to overlap a conveying trajectory T of the second panel conveying unit 600. Here, the second roller unit 720, which is positioned at a side (above the panel P based on FIG. 6) opposite to the second panel conveying unit 600 based on the panel P, serves as the attachment roller unit in the second mode, and the first roller unit 710 serves as the non-attachment roller unit. The first roller unit 710, which is the non-attachment roller unit in the second mode, may be disposed such that the connecting unit 714 moves along the horizontal guide unit 620 in parallel with the conveyance direction of the panel P (the left direction based on FIG. 6) without overlapping the conveying trajectory T of the second panel conveying unit 600. Therefore, the second panel conveying unit 600 may be in a state in which the second panel conveying unit 600 may convey the panel P in one direction (in the left direction based on FIG. 6) without interference with the laminating unit 700.

Further, to laminate the optical film F on the panel P, the tip portion P_a of the panel P and the tip portion of the optical film F may be aligned, and then the attachment roller 722 of the second roller unit 720 may move adjacent to the lower surface of the panel P to press the tip portion of the optical film F against the lower surface of the panel P. Further, the suction plate 610 is conveyed in parallel with one direction of the horizontal guide unit 620 (the left direction based on FIG. 6), and the attachment roller 722 of the second roller unit 720 rotates in synchronization with a conveying speed of the suction plate 610, such that the optical film F is laminated on the panel P. Like the first exemplary embodiment, even in the second exemplary embodiment, the panel P is conveyed by the suction plate 610 that moves in one direction of the horizontal guide unit 620 when the optical film F is being laminated on the panel P, and as a result, the meandering of the panel P may be minimized and thus the attachment precision of the optical film may be improved in comparison with the first mode.

According to the optical film laminating system according to the exemplary embodiment of the present invention, the single optical film laminating system may manufacture all multiple types of display units which are classified by attachment conditions.

In particular, optical film laminating apparatus or mechanisms, which are optimized in accordance with required attachment conditions, may different from each other. However, the optical film laminating system according to the exemplary embodiment of the present invention may simply switch the optical film laminating means optimized in accordance with the attachment conditions.

Specifically, in terms of process efficiency in minimizing a process time, the first method, which inputs the panel and the optical film between the pair of rollers, is suitable to laminate the optical film to manufacture a display unit that requires relatively low attachment precision, and the second method, which increases the amount of time taken to fix the panel in order to minimize meandering of the panel, is suitable to laminate the optical film to manufacture a display unit that requires relatively high attachment precision. The optical film laminating system according to the exemplary embodiment of the present invention may implement both of the first method and the second method.

While the present invention has been described with reference to the aforementioned exemplary embodiments, various modifications or alterations may be made without departing from the subject matter and the scope of the invention. Accordingly, the appended claims include the modifications or alterations as long as the modifications or alterations fall within the subject matter of the present invention.

The invention claimed is:

1. An optical film laminating system comprising:
a first panel conveying unit which includes multiple conveying rollers that support a lower portion of the panel and convey the panel;
a second panel conveying unit which holds any one of an upper portion or a lower portion of the panel by suction and conveys the panel;
a laminating unit for laminating an optical film on the panel and includes a first roller unit and a second roller unit disposed to be vertically spaced apart from each other; and
a control unit which sets, in accordance with attachment conditions, an optical film laminating mode in respect to the panel to at least one of a first mode in which the panel and the optical film are inputted together between the first roller unit and the second roller unit so that the optical film is laminated on the panel, and a second mode in which the second panel conveying unit holds the panel by suction while it conveys the panel and the optical film through the laminating unit, and the panel and optical film engages any one of the first roller unit and the second roller unit, so that the optical film is laminated on the panel, wherein the control unit is configured to select either the first mode or the second mode based upon attachment position precision requirements of the optical film in respect to the panel, and the attachment position precision required in the second mode is higher than the attachment position precision required in the first mode.

2. The optical film laminating system of claim 1, wherein when the optical film laminating mode in respect to the panel is set to the second mode by the control unit, the first roller unit and the second roller unit are disposed with the panel interposed therebetween at a side opposite to the second panel conveying unit.

3. The optical film laminating system of claim 1, wherein when the optical film laminating mode in respect to the panel is set to the second mode by the control unit, a non-attachment roller unit, which is one of the first roller unit and the second roller unit and is not the attachment roller unit, is disposed so as not to overlap a conveying trajectory of the second panel conveying unit.

4. The optical film laminating system of claim 2, wherein a roller unit, which is one of the first roller unit and the second roller unit and is positioned to be closer to the second panel conveying unit than is the other of the first roller unit and the second roller unit, includes a support roller, an upper roller and a lower roller which are vertically disposed with the support roller interposed therebetween.

5. The optical film laminating system of claim 1, wherein when the optical film laminating mode in respect to the panel is set to the first mode by the control unit, the second panel conveying unit is configured to fix and hold a part of the panel by suction for a predetermined period of time before the first roller unit and the second roller unit rotate.

6. The optical film laminating system of claim 1, wherein when the optical film laminating mode in respect to the panel is set to the second mode by the control unit, the attachment roller unit laminates the optical film on the panel by pressing the optical film against the panel which is being held by suction and conveyed by the second panel conveying unit.

7. The optical film laminating system of claim 1, further comprising:
an optical film support unit which supports and holds, by suction, an upstream portion of the optical film which is positioned upstream from a tip portion of the optical film laminated on the panel in a conveyance direction of the optical film,
wherein the optical film support unit moves in the conveyance direction of the optical film while holding the upstream portion of the optical film by suction when the optical film is being laminated on the panel.

8. The optical film laminating system of claim 7, wherein after the optical film is completely laminated on the panel, the optical film support unit is configured to release the optical film, move in a direction opposite to the conveyance direction of the optical film, and then support and hold, by suction, an upstream portion of an optical film subsequent to the optical film being completely laminated.

9. An optical film laminating apparatus comprising:
a first panel conveying unit which includes multiple conveying rollers that support a lower portion of the panel and convey the panel;
a second panel conveying unit which holds any one of an upper portion and the lower portion of the panel by suction and conveys the panel;
a laminating unit for laminating an optical film on the panel and includes a first roller unit and a second roller unit disposed to be vertically spaced apart from each other;
a control unit which sets, in accordance with attachment conditions, an optical film laminating mode in respect to the panel to at least one of a first mode in which the panel and the optical film are inputted together between the first roller unit and the second roller unit so that the optical film is laminated on the panel, and a second mode in which the second panel conveying unit holds the panel by suction while it conveys the panel and the optical film through the laminating unit, and the panel and optical film engages any one of the first roller unit and the second roller unit, so that the optical film is laminated on the panel, wherein the control unit is configured to select either the first mode or the second mode based upon attachment position precision requirements of the optical film in respect to the panel, and the attachment position precision required in the second mode is higher than the attachment position precision required in the first mode; and a drive unit which shifts a position of at least one of the first roller unit and the second roller unit when the control unit switches the optical film laminating mode in respect to the panel from one of the first mode and the second mode to the other of the first mode and the second mode.

\* \* \* \* \*